United States Patent
Stein

(10) Patent No.: US 6,359,394 B1
(45) Date of Patent: *Mar. 19, 2002

(54) SCHEME FOR SAMPLING LAMP CONDITIONS DURING IGNITION AND STEADY STATE MODES OF LAMP OPERATION

(75) Inventor: Mitchel J. Stein, LaGrangeville, NY (US)

(73) Assignee: Phillips Electronics North America Corporation, New York, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 78 days.

(21) Appl. No.: 09/469,335

(22) Filed: Dec. 22, 1999

(51) Int. Cl.[7] ................................. G05F 1/00
(52) U.S. Cl. .................. 315/307; 315/291; 315/224; 315/DIG. 7
(58) Field of Search ................ 315/307, 291, 315/209 R, 224, DIG. 4, DIG. 7

(56) References Cited

U.S. PATENT DOCUMENTS

| | | | |
|---|---|---|---|
| 5,103,141 A | | 4/1992 | Keijser et al. .............. 315/307 |
| 5,198,728 A | * | 3/1993 | Bernitz et al. .............. 315/307 |
| 5,262,701 A | * | 11/1993 | Derra et al. ................ 315/224 |
| 5,343,122 A | * | 8/1994 | Sugimori et al. ....... 315/209 R |
| 5,557,207 A | | 9/1996 | Duve .......................... 324/414 |
| 5,600,211 A | * | 2/1997 | Luger ......................... 315/307 |
| 5,742,134 A | | 4/1998 | Wacyk et al. ............... 315/307 |
| 6,057,651 A | * | 5/2000 | Usami ........................ 315/291 |
| 6,060,843 A | * | 5/2000 | Primisser et al. .......... 315/291 |

FOREIGN PATENT DOCUMENTS

| | | | |
|---|---|---|---|
| EP | 0228123 A1 | 7/1987 | ......... H05B/41/392 |
| EP | 0459126 A1 | 12/1991 | ........... H05B/41/38 |
| EP | 0735801 A1 | 10/1996 | ........... H05B/41/29 |

* cited by examiner

Primary Examiner—Don Wong
Assistant Examiner—Tuyet T. Vo

(57) ABSTRACT

A ballast for powering a high intensity discharge lamp includes at least one voltage divider for sampling a lamp operating condition and producing a sampled signal based on a scaling factor applied to the sampled lamp operating condition. The ballast also includes a controller for driving an inverter in response to the sampled signal. The scaling factor varies based on the mode of lamp operation and is substantially larger during lamp ignition than during steady state lamp operation.

8 Claims, 1 Drawing Sheet

SCHEME FOR SAMPLING LAMP CONDITIONS DURING IGNITION AND STEADY STATE MODES OF LAMP OPERATION

BACKGROUND OF THE INVENTION

The present invention relates to a method for controlling the operation of a high intensity discharge lamp and, more specifically for controlling a high intensity discharge lamp during lamp ignition and steady state operation.

A conventional high intensity discharge (HID) ballast, shown in FIG. 1, receives a power from an AC mains 100. A preconditioner/up-converter 110 includes circuitry for rectification of the AC power, power factor correction and for boosting of the AC peak voltage.

A regulated DC voltage (Vbus) is supplied to an inverter 120 (e.g. full-bridge type). The inverter output is supplied to the serial combination of a blocking capacitor Cs, inductor L and capacitor C. Inductor L and capacitor C form a resonant circuit. Inverter 120 typically operates at a switching frequency so as to be in an inductive mode (i.e. above the resonant frequency of the resonant circuit). Lamp 130 is connected across capacitor C.

A fixed voltage divider circuit 210 includes a plurality of resistors R1, R2, R3 and R4 and a pair of taps t1 and t1' between resistors R1 and R2 and between resistors R3 and R4, respectively. A circuit 210 including a pair of voltage dividers divides down/sets the differential lamp voltage such that a sample 220 of the latter is at a conventional electronics level suitable for input to an integrated circuit 3. Integrated circuit 3 serves as a controller for controlling operation of lamp 130.

An ignitor (not shown) typically can produce ignition voltages of about 3.5 kilovolts (KV). In order to sample the lamp voltage during ignition, the lamp voltage is lowered or divided down to a usable level of less than 15 volts through circuit 210. Unfortunately, voltage divider circuit 210 will lower or divide down steady-state voltages, typically of about 200 volts, to less than 1-volt full scale. Voltages of such small magnitude are too small to yield good resolution, that is, are too small in magnitude to accurately reflect lamp operating conditions.

It is therefore desirable to provide a new and improved ballast which includes a sampling scheme for accurately reflecting lamp operating conditions during ignition and steady-state conditions.

SUMMARY

In accordance with a first aspect of the invention, a ballast for powering a high intensity discharge lamp includes an inverter for supplying power to the lamp, at least one voltage divider for sampling a lamp operating condition and producing a sampled signal based on a scaling factor applied to the sampled lamp operating condition and a controller for driving the inverter in response to the sampled signal. The scaling factor varies based on the mode of lamp operation.

The sampled signal is always of a sufficient magnitude to yield good resolution. Consequently, lamp operating conditions can be accurately monitored. The magnitude of the sampled signal is maintained at an acceptable level by varying the scaling factor based on the mode of lamp operation.

It is a feature of this first aspect of the invention that the mode of lamp operation includes lamp ignition and steady-state lamp operation. Typically, the scaling factor applied is substantially larger during lamp ignition than during steady-state lamp operation. It is another feature of this first aspect that the at least one voltage divider includes two strings of resistors and further includes a pair of switches. Each switch selects which of the resistors from an associated string are to be coupled to the controller in response to instructions from the controller.

In accordance with a second aspect of the invention, a method of operating a high intensity discharge lamp ballast includes the steps of applying a scaling factor to a sampled lamp operating condition in producing a sampled signal, driving an inverter in response to the sampled signal, and varying the scaling factor based on the mode of lamp operation. The step of varying the scaling factor includes substantially reducing the scaling factor applied to the sampled lamp operating condition during steady-state lamp operation as compared to lamp ignition operation.

Accordingly, it is an object of the invention to provide an improved ballast which includes a sampling scheme for accurately reflecting lamp operating conditions during ignition and steady-state conditions.

Still other objects and advantages of the invention will, in part, be obvious and will, in part, be apparent from the specification.

The invention accordingly comprises several steps in the relation of one or more such steps with respect to each of the others, and a device embodying features of construction, combination of elements, and arrangements of parts which are adapted to effect such steps, all is exemplified in the following detailed disclosure, and the scope of the invention will be indicated in the claims.

BRIEF DESCRIPTION OF THE DRAWINGS

The foregoing objects and advantages of the present invention may be more readily understood by one skilled in the art with reference being had to the following detailed description of a preferred embodiment thereof, taken in conjunction with the accompanying drawings wherein like elements are designated by identical reference numerals throughout the several views, and in which.

DETAILED DESCRIPTION OF THE PREFERRED EMBODIMENT

Figure 1:
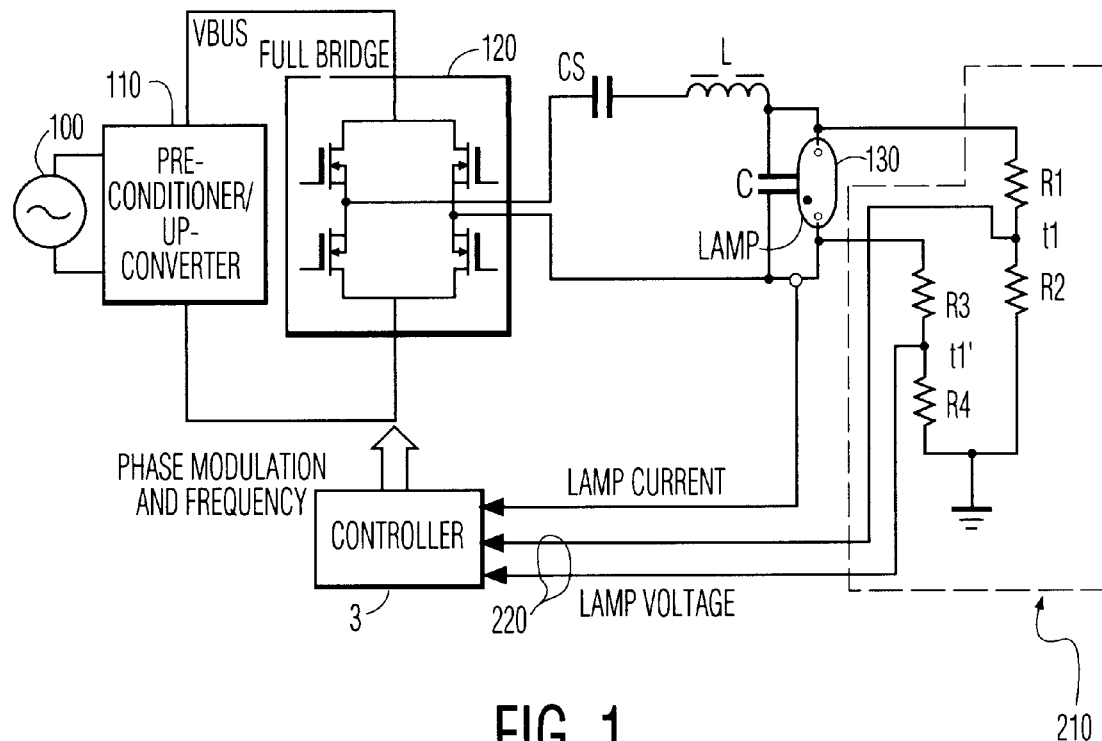
FIG. 1 is a schematic diagram of a prior art HID ballast circuit.
Figure 2:
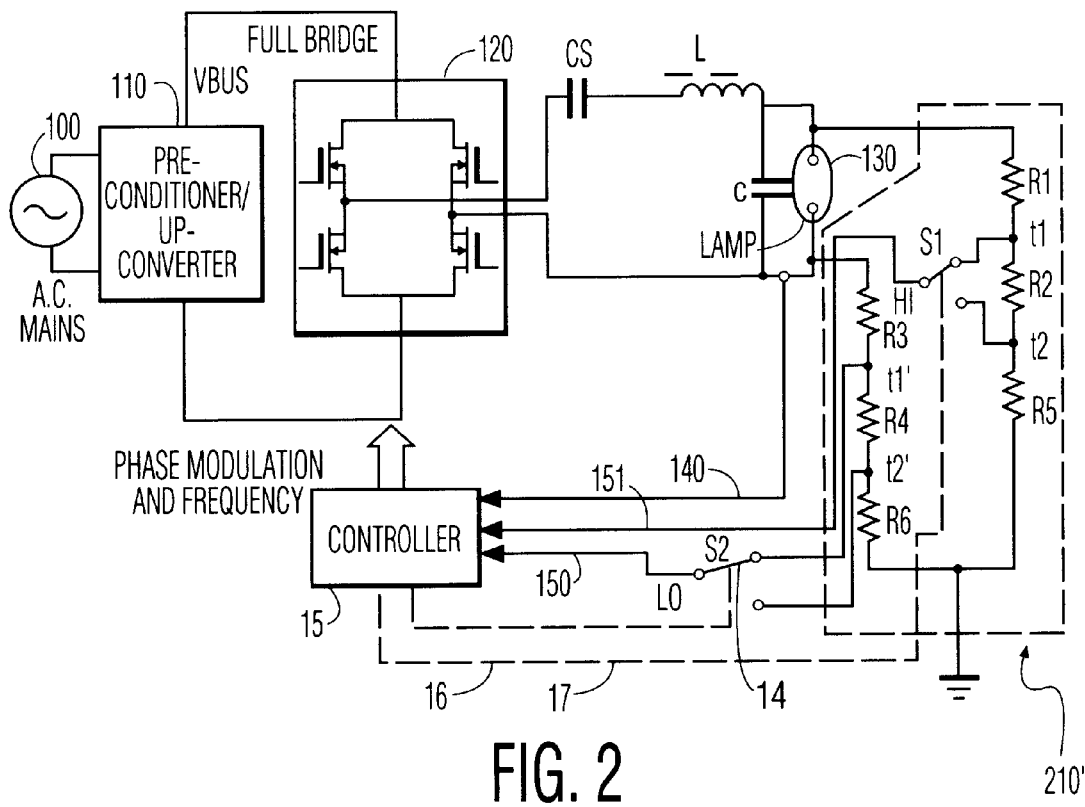
FIG. 2 is a schematic diagram of an HID ballast circuit in accordance with the invention.

The present invention, shown in FIG. 2, adds additional control logic circuitry to a voltage divider 210'. The additional circuitry includes additional resistors R5 and R6, a tap $t_2$ which is positioned between resistors R2 and R5 and a tap $t_{2'}$ which is inserted between resistors R4 and R6.

Resistors R1, R2 and R5 form a first voltage divider/string of resistors and resistors R3, R4 and R6 form a second voltage divider/string of resistors. A switch S1 associated with the first string selects the voltage at tap $t_1$ or at tap $t_2$ based on instructions generated by a controller 15. These instructions are supplied to switch S1 along a line 16. A switch S2 associated with the second string selects the voltage at tap $t_{1'}$ or at tap $t_{2'}$ based on instructions generated by a controller 15. These instructions are supplied to switch S2 along a line 17.

The voltage supplied by a line 151 to controller 15 represents a sample of the voltage at the high potential end of lamp 130. The voltage supplied by a line 150 to controller 15 represents a sample of the voltage at the low potential end of lamp 130. The voltage difference between lines 151 and 150 represents the lamp voltage. Controller 15 also receives a signal representing the level of lamp current from a line 140. The switching frequency of inverter 120 is controlled by controller 15 and is based on the input signals from lines 140, 150 and 151. Controller 15 determines the mode of lamp operation (i.e. lamp ignition and steady state operation) based on the level of lamp current. The instructions from controller 15 to switches S1 and S2 reflect this determination.

Each of the sampled signals supplied by lines 150 and 151 can be varied in magnitude (i.e. scaled) by changing the tap voltage selected by the associated switch. Switch S1 selects either the voltage at tap $t_1$ or at tap $t_2$ based on the instructions received from controller 15. Switch S2 selects either the voltage at tap $t_{1'}$ or at tap $t_{2'}$ based on the instructions received from controller 15. The voltages at tap $t_1$ and at tap $t_{1'}$ will be of a larger magnitude than the voltages at tap $t_2$ and at tap $t_{2'}$, respectively.

More particularly, by selecting tap $t_2$ rather than tap $t_1$ a larger scaling factor will be applied to the voltage being sampled by the first voltage divider formed by resistors R1, R2 and R5. By selecting tap $t_{2'}$ rather than tap $t_{1'}$ a larger scaling factor will be applied to the voltage being sampled by the second voltage divider formed by resistors R3, R4 and R6.

The sampled signals supplied by lines 150 and 151 are always of a sufficient magnitude to yield good resolution. The larger scaling factor (i.e. selection of taps $t_2$ and $t_{2'}$) is applied during lamp ignition when very high magnitudes of lamp voltage are experienced. The smaller scaling factor (i.e. selection of taps $t_1$ and $t_{1'}$) is applied during steady state lamp operation when much smaller magnitudes of lamp voltage are experienced. The voltage levels of the sampled signals supplied by lines 150 and 151 are typically kept at or near full scale during the ignition and during the steady state operation. Consequently, lamp operating conditions can be accurately monitored during either mode of lamp operation by controller 15. In other words, the magnitudes of these sampled signals are maintained at an acceptable level by varying the scaling factors based on the mode of lamp operation.

While the invention has been particularly shown and described with respect to an illustrative and preferred embodiment thereof, it will be understood by those skilled in the art that the foregoing and other changes in form and details may be made therein without departing from the spirit and scope of the invention that should be limited only by the scope of the appended claims.

Having thus described my invention, what I claim as new, and desire to secure by Letters Patent is:

1. A ballast for powering a high intensity discharge lamp, comprising:

an inverter for supplying power to the lamp;

at least one voltage divider for sampling a lamp operating condition and producing a sampled signal based on a scaling factor applied to the sampled lamp operating condition; and a controller for driving the inverter in response to the sampled signal;

wherein the scaling factor is controlled by the controller and varies based on the mode of lamp operation.

2. The ballast of claim 1, wherein the mode of lamp operation includes lamp ignition and steady-state lamp operation.

3. The ballast of claim 1, wherein the at least one voltage divider includes two strings of resistors and further includes a pair of switches, each switch selecting which of the resistors from an associated string are to be coupled to the controller in response to instructions from the controller.

4. The ballast of claim 3, wherein the controller further determines the mode of lamp operation based on the level of lamp current, the instructions from the controller to the switches reflecting this determination.

5. A method of operating a high intensity discharge lamp ballast, comprising the steps of:

sensing an electrical condition resulting from ballast operation to determine a mode of lamp operation;

applying a scaling factor to a sampled lamp operating condition for producing a sampled signal;

driving an inverter in response to the sampled signal; and varying the scaling factor based on the determined mode of lamp operation.

6. The method of claim 5, wherein the step of varying the scaling factor includes substantially reducing the scaling factor applied to the sampled lamp operating condition during steady-state lamp operation as compared to lamp ignition operation.

7. A ballast for powering a high intensity discharge lamp having a plurality of modes of operation including lamp ignition and at least one steady-state operating mode, comprising:

an inverter for supplying power to the lamp;

at least one voltage divider for sampling a lamp operating condition and producing a sampled signal based on a scaling factor applied to the sampled lamp operating condition; and a controller for driving the inverter in response to the sampled signal;

wherein the scaling factor is substantially larger during lamp ignition than during steady-state operation.

8. The ballast of claim 7, wherein the at least one voltage divider includes two strings of resistors and further including a pair of switches, each switch selecting which of the resistors from an associated string are to be coupled to the controller in response to instructions from the controller, the controller determining the mode of lamp operation based on the level of lamp current wherein the instructions from the controller to the switches reflect this determination.

* * * * *